United States Patent [19]

Johnson et al.

[11] Patent Number: 5,228,524
[45] Date of Patent: Jul. 20, 1993

[54] FLUID SYSTEM FOR CONTROLLING FLUID LOSSES DURING HYDROCARBON RECOVERY OPERATIONS

[75] Inventors: Michael H. Johnson, Spring; Kelvin D. Smejkal, Houston, both of Tex.

[73] Assignee: Baker Hughes Incorporated, Houston, Tex.

[21] Appl. No.: 846,500

[22] Filed: Feb. 25, 1992

[51] Int. Cl.$^5$ ............................................. E21B 33/138
[52] U.S. Cl. ...................................... 175/72; 166/282; 507/108
[58] Field of Search ........................... 175/72; 166/282; 252/8.551; 507/108

[56] References Cited

U.S. PATENT DOCUMENTS

| | | | |
|---|---|---|---|
| 3,785,438 | 1/1974 | Jackson et al. | 166/295 |
| 3,844,361 | 10/1974 | Jackson | 175/66 |
| 3,986,964 | 10/1976 | Smithey | 507/110 X |
| 3,988,246 | 10/1976 | Hartfiel | 175/65 X |
| 4,025,443 | 5/1977 | Jackson | 252/8.5 A |
| 4,098,700 | 7/1978 | Hartfiel | 252/8.5 A |
| 4,140,639 | 2/1979 | Jackson | 252/8.5 A |
| 4,186,803 | 2/1980 | Mondshine | 166/292 |
| 4,192,756 | 3/1980 | Mondshine | 252/8.55 R |
| 4,369,843 | 1/1983 | Mondshine | 166/292 |
| 4,620,596 | 11/1986 | Mondshine | 175/72 X |
| 4,621,692 | 11/1986 | Mondshine | 166/281 |
| 4,650,593 | 3/1987 | Slingerland | 507/108 X |

OTHER PUBLICATIONS

N. C. Mahajan, et al., "Bridging Particle Size Distribution: A Key Factor in the Designing of Non-Damaging Completion Fluids," Fourth Symposium on Formation Damage Control of the SPE, Jan. 28-29, 1980.

Primary Examiner—William P. Neuder
Attorney, Agent, or Firm—Rosenblatt & Assoc.

[57] ABSTRACT

A fluid system has been discovered using graded calcium carbonate particle sizes and a modified lignosulfonate. Optionally, a thixotropic polymer such as a welan or xanthum gum polymer is used to keep the $CaCO_3$ and lignosulfonate in suspension. It is important that the calcium carbonate particles be distributed across a wide size range to effectively prevent filtration or fluid loss into the formation. Further, the lignosulfonate must be polymerized to an extent effective to reduce its water solubility. The modified lignosulfonate (lignin sulfonate) is necessary for the formation of a filter cake essentially on the surface of the well bore. Since the filter cake particles do not invade the well bore due to the action of the modified lignosulfonate, no high pressure spike occurs during the removal of the filter cake which indicates damage to the formation and well bore surface and typically reduces overall permeability of the formation. The rheological properties of the fluid allow it to be used in a number of applications where protection of the original permeable formation is desirable. The applications include, but are not limited to, drilling, fracturing and controlling fluid losses during completion operations, such as gravel packing or well bore workovers.

19 Claims, No Drawings

FLUID SYSTEM FOR CONTROLLING FLUID LOSSES DURING HYDROCARBON RECOVERY OPERATIONS

FIELD OF THE INVENTION

The invention relates to fluid or mud systems for use in controlling fluid losses during hydrocarbon recovery processes, such as drilling, fracturing, gravel packing and well bore workovers, and more particularly relates to such fluids, in one aspect, which form a durable, thin filter cake, but which is easy to remove and results in little damage to the permeability of the formation.

BACKGROUND OF THE INVENTION

Horizontal wells drilled and completed in unconsolidated sand reservoirs have become feasible recently, due to new technology and completion methods. Wells of this type require sand control, for example such as long open hole gravel packs or the installation of mechanical sand exclusion devices (slotted liners, prepacked screens, etc.). Successful wells have been completed with horizontal, producing intervals as long as 1800 ft. (550 m) using these methods of sand control.

Usually the wells are drilled with conventional drilling muds to the top of the pay zone and casing is set. The cement is then drilled out to the casing shoe and the shoe is tested. The drilling mud is then displaced with a "low damage potential drilling fluid" generally consisting of polymers, viscosity enhancers and soluble particles for building a filter cake. The particles are usually graded salt (NaCl) or graded calcium carbonate ($CaCO_3$), though the distribution of the size of the particles within a particular graded product has never been a concern. These compounds are used because they are soluble in undersaturated brines or hydrochloric acids. One problem with prior art filter cakes is that they are often difficult to remove requiring high pressures to do so. Under such conditions, damage results to the formation. Such damage is believed to occur because the filter cake invades the formation and becomes "cemented" thereto and must be forcibly removed at high pressure; the forceful removal is thought to cause damage to the permeability of the formation.

After the open hole interval has been drilled to total depth, the gravel pack screen or sand exclusion device is placed in the open hole interval. To do this it becomes necessary to circulate the drilling fluid from the open hole so that the well can be gravel packed or the sand exclusion setting can be tested. Displacement of the drilling fluid with a solid-free completion brine, usually viscosified with a water soluble polymer, e.g. hydroxyethylcellulose (HEC) or xanthum gum derivative, is necessary. Concern about the physical erosion of the filter cake with the completion fluid is also always an issue. That is, the filter cake should be durable and stable enough to permit the completion or other operation to take place and protect the well bore during the entire operation.

The ideal drilling mud or drill-in fluid would mechanically seal all pore openings exposed to the well bore, stay intact during completion operations, then be easily removed by production of oil or gas. Problems arise in designing these fluids or muds because production zones vary in pressure, permeability, porosity and formation configuration. Generally, fluids used to control fluid leak-off in permeable formations require an initial high pressure spike before removal can begin, from about 300 to 500 psi. This pressure spike is indicative of damage to the original permeability of the permeable formation. It would be desirable if fluids could be devised which would easily form an impermeable filter cake to prevent the loss of expensive completion fluids to the formations and which effectively protects the original permeable formation during various completion operations such as gravel packing or well bore workovers. At the same time, however, it is also highly desirable for the filter cake to be easily removable at the beginning of production causing little or no damage to the formation.

SUMMARY OF THE INVENTION

Accordingly, it is an object of the present invention to provide a fluid system which forms a very durable, thin filter cake on the permeable formation and prevents fluid losses thereto.

It is another object of the present invention to provide a fluid system which forms a filter cake that can be easily removed with little or no damage to the formation.

It is yet another object of the invention to provide a fluid system for controlling fluid loss which has application during drilling, completion and stimulation of permeable reservoirs, during a variety of such operations such as gravel packing or well bore workovers.

In carrying out these and other objects of the invention, there is provided, in one form, a fluid system for controlling fluid losses during hydrocarbon recovery operations, having water, graded calcium carbonate particle sizes, and a modified lignosulfonate.

DETAILED DESCRIPTION OF THE INVENTION

A fluid system has been discovered using a graded calcium carbonate particle sizes, a modified lignosulfonate (lignin sulfonate) and water, and optionally a thixotropic polymer such as a welan gum polymer, which has unique properties for controlling fluid losses into permeable formations. The mechanism is apparently due to the fluid's unique filter cake properties. The fluid forms a very durable, thin cake that acts like a check valve on the permeable formation. Surprisingly, the fluid of this invention exhibits little or no removal pressure spike, even when placed at high differential pressure. Testing has indicated the filter cake from the inventive fluid is easy to remove and yields very low or minimal damage to the original permeability of the permeable formation. The rheological properties of this fluid allow it to be used in a number of applications where protection of the original permeable formation is desirable. For example, the applications include drilling, fracturing, and controlling fluid losses during completion operations such as gravel packing or well bore workovers.

The fluid systems of this invention require two main components: (1) a graded calcium carbonate and (2) a modified lignosulfonate, in addition to water. In a broad embodiment of the invention, the proportions of the various components range from about 70 to 90 wt. % water; from about 10–30 wt. % graded calcium carbonate particles and from about 2 to 5 wt. % of the modified lignosulfonate. In another aspect of the invention, the components range from about 73 to 83 wt. % water; about 13 to 24 wt. % graded calcium carbonate particle sizes; and from about 3 to about 4 wt. % modified lignosulfonate. In another embodiment, the proportions range from about 78 to 83 wt. % water; about 13 to 18 wt. % blend of graded calcium carbonate particle sizes; and from about 3 to about 4 wt. % modified lignosulfonate. Most preferably, the proportions of the fluid components range from about 82 to 83 wt. % water; about 13 to 14 wt. % blend of graded calcium carbonate particle sizes; and from about 3 to about 4 wt. % modified lignosulfonate. It most commercial embodiments of the inventive fluids, it will be very desirable to include a viscosifier to keep the particles and the modified lignosulfonates in suspension. Suitable viscosifiers include, but are not limited to, welan gum polymers, xanthum gum derivatives, and any other thixotropic polymer having gel strength. The proportions of the thixotropic polymer may range in one aspect from about 0.25 to 0.40 wt. %, more preferably from about 0.31 to about 0.35 wt. %, most preferably from about 0.34 wt. % to about 0.35 wt. %. Other ingredients may be present in the drilling fluid system as long as they do not adversely affect the performance of the system.

It is important that the calcium carbonate ($CaCO_3$) particles be graded so that their size distribution will be relatively broad or wide and result in a thin filter cake of extremely low permeability, and so that minimal invasion of particles and filtrate will occur when the filter cake forms on the borehole. That is, these drilling muds or drill-in fluids are specially designed systems to be used to drill a production zone with minimal damage to the formation and thus, the subsequent production of hydrocarbons. It will thus be appreciated that the exact grading for a particular fluid will depend in large measure on the permeability characteristics of the formation. Generally, by the term "graded" it is meant that the calcium carbonate particles have a certain defined size distribution. It has been discovered in the composition of this invention that the graded $CaCO_3$ should have a relatively wide, rather than a narrow distribution of size. That is, the particles should not have too much of any one size in the proportion used in the fluid. For example, Milpark Drilling Fluids W.O. 30C (coarse) product has about 100% of its particles less than 200 microns in diameter but only about 40% of its particles less than 100 microns indicating most of the particles are between 100 and 200 microns which may be too narrow a distribution for most applications of the inventive fluids. A product such as Baroid's M-50 which has a more diverse distribution of sizes, for example, 100% less than 200μ, 80% less than 75μ, 60% less than 40μ, 40% less than 25μ and 20% less than 8μ. It will be appreciated that even if a particular grade of calcium carbonate is too narrow for this fluid, that by blending two or more grades of calcium carbonate that a particle size distribution may be obtained which is suitable. For example, if Baroid's M-50 grade is acceptable, such distribution may be approximated by blends of other products, e.g. 50% of Huber's M-50 and Q-200 products or even a 66% M-50 and 33% Q-200 blend. Examples of commercially available graded calcium carbonate which may be useful in this invention either alone or as blends include, but are not limited to, W.O. 30F, W.O. 30C and SRP-0197 sold by Milpark Drilling Fluids; M-3, M-4, M-6, M-50, M-200, M-300, Q-60, Q-100 and Q-200 sold by J. M. Huber Corp.; Baracarb sized $CaCO_3$ sold by Baroid as well as M-5 and M-50; and all made by Metsa-Serla. The material sold as Q-200 by Huber and designated SRP-0197 by Milpark Drilling Fluids, which is believed to be the same material, is particularly preferred as it performs best in experimental formulations. Its size distribution is given in Table IX, infra. Ideally, the particle size distribution of the fluid system of this invention should be one which is close to or approximates this material. In one aspect of the invention, it has a distribution of the following Table A.

TABLE A

| $CaCO_3$ Particle Size Distribution | |
|---|---|
| Particle Size (microns) | Percent Smaller Than Than Given Size, But Larger Than Next Size |
| 128 | 0 |
| 96 | 6.1–7.5 |
| 64 | 6.1–7.5 |
| 48 | 18.3–22.3 |
| 32 | 11.2–13.6 |
| 24 | 9.4–11.4 |
| 16 | 6.6–8.0 |
| 12 | 6.5–7.9 |
| 8 | 5.6–6.8 |
| 6 | 5.2–6.4 |
| 4 | 3.5–4.3 |
| 3 | 2.6–3.2 |
| 2 | 2.5–3.1 |
| 1.5 | 1.1–1.3 |
| 1 | 5.4–6.6 |

It is believed, without being limited to any one theory, that too narrow a distribution provides too many of the same size of particle which therefore tend to stack like marbles with interstices or spaces between the relatively uniform particles which permit fluid flow therethrough. By using a distribution of various sizes, the gaps between the larger particles are filled by the succeedingly smaller particles. Permeability and porosity are a function of the grain size of the particles making up the formation. Using one non-limiting example, if the average grain size of the particular formation is x, then the size of the particles used as the filter media in the filter cake might be x/6 or some other formula. However, as explained above, not all of the filter media particles should be x/6, but they should be distributed or graded about the x/6 point. For example, x/2 fluid particles would "bridge" across the spaces between the x grains of the formation. In turn, x/3 particles would bridge between the x/2, which in turn would be bridged by the x/4 particles and so forth (to and beyond less than x/6, to x/7, etc.) until complete blockage occurs. While this is an oversimplified illustration, it does explain why a fluid having a wide or graded distribution of calcium carbonate particle sizes forms a more impermeable filter cake than one with a more narrow distribution and uniform particle size. It is also apparent that it is not possible to specify the exact size distribution of the particles in any given fluid, since the distribution depends on the average grain size of the formation where the fluid is to be used.

The modified lignosulfonates are also important to the inventive fluid loss control fluids. It is important that the lignosulfonates be modified by polymerizing them at least to the extent that their water solubility is decreased from that which they would normally have. This decrease in water solubility may occur just by increasing the molecular weight of the lignosulfonates, although the inventors do not wish to be bound by any one theory. These suitable materials may also be described as polyelectrolyte modified lignosulfonates which are anionic polymers with cross-linked sulfonate radicals. Filtrex sold by Milpark Drilling Fluids is described as a polyelectrolyte modified leonardite-based natural polymer. It is believed that the sulfonate functional groups are crosslinked with sugars, although it is within the scope of this invention to use other crosslinking agents.

One non-limiting hypothesis about how the invention works involves the modified lignosulfonates coating or encapsulating the calcium carbonate particles with a thin shell which somehow acts as an elastic connecting the particles together in a "loose" way that covers and protects essentially the surface of the well bore, without invading or penetrating into the formation. In some unique way, the filter cake thus built up is durable during operations but may be easily removed at the beginning of the fluid replacement and hydrocarbon recovery phase with little or no pressure spike. The lack of pressure spike is believed to be due to the fact that the filter cake does not invade the formation nor form a cake which is too highly connected and rigid and which peels away particle by particle, rather than in lumps or masses. For example, the filter cakes from the fluid loss system of this invention may be removed at pressures equal to or less than 10 psi.

It has been demonstrated that the effects of "skin damage" (very shallow permeability damage into the formation from the well bore; total thickness: 0.1 ft.) on estimated production can be very minimal. If permeability is reduced by 50% in a small area space as in skin damage (0.5–0.6 ft invasion from the well bore; total thickness: 9.5 ft.), the overall effect on production is minor, only a 2.1% reduction occurs. On the other hand, if damage to the formation continues reducing the permeability deeper (e.g. from 0.5 to 10 ft into the formation), production can be lowered by 26%.

In one embodiment of the invention, the well bore is in a formation having a permeability, and where the permeability of the formation prior to injecting the fluid system is $K_i$ and the permeability of the formation after removing the filter cake from the well bore is $K_f$. Using the fluid loss system of this invention, $K_f/K_i$ ranges from 0.90 to 1.0, preferably 0.95 to 1.0. In many commercial systems, $K_f/K_i$ is much less than 0.9.

The fluid loss system of this invention provides a filter cake which does not have to be removed from the wall of the formation or from prepacked perforations before gravel packing. The filter cake will pass through the gravel pack and screen. All commercially available products require removal of the filter cake prior to placement of the gravel pack because its removal damages the formation and the cake material will not pass through the gravel pack and screen. The filter cake formed by the inventive fluid loss system and the fluid when used as a prepad for "frac packing" will pass through the frac pack. All products of this nature on the market are damaging and will not return through the pack. That is, the particles of the filter cake will easily pass through the sand used to prop apart the fractures in the formation. The ability of the filter cake to pass through these structures is further evidence that it may break up one particle at a time, rather than in masses or clumps.

The invention will now be further described by the use of the following nonlimiting Examples which are merely illustrative without being restrictive.

EXAMPLES 1 AND 2

A fluid/mud system of this invention (Example 1) and one of more conventional formulation (Example 2) were assembled as described in Table I.

TABLE I

| Compositions of Fluid Loss Systems | | |
|---|---|---|
| Component | (Inventive) Example 1 | (Comparative) Example 2 |
| Water, cc | 317 | 317 |
| Biozan, g | 1.36 | 1.36 |
| SRP-0197, g | 50 | — |
| W.O. 30 C,. g | — | 25 |
| W.O. 30 F., g | — | 25 |
| Dicalite 104, g | — | 25 |
| Filtrex, g | 15 | 15 |
| KCl 4%, g | 12.9 | 12.9 |

For both Examples, the HPHT dynamic filtration unit testing parameters were maintained at 300 rpm, 500 psi and 250° F. Dynamic filtration results are as shown in Table II.

TABLE II

| Dynamic Filtration Results: Examples 1 and 2 | | | | | | | | | | | | | |
|---|---|---|---|---|---|---|---|---|---|---|---|---|---|
| Example 1 | | | | | | | | | | | | | |
| Minutes | 1 | 2 | 3 | 4 | 5 | 6 | 7 | 8 | 9 | 10 | 15 | 20 | 25 | 30 |
| Cumulative Filtrate | 4 | 5 | 5.6 | 6 | 6.4 | 7 | 7.2 | 7.5 | 7.8 | 8 | 9.2 | 10 | 10.8 | 11.4 |
| × 2 | 8 | 10 | 11.2 | 12 | 12.4 | 14 | 14.8 | 15 | 15.6 | 16 | 18.4 | 20 | 21.6 | 22.8 |
| Cake Thickness (mm) | 1.0 | | | | | | | | | | | | | |
| Example 2 | | | | | | | | | | | | | |
| Minutes | 1 | 2 | 3 | 4 | 5 | 6 | 7 | 8 | 9 | 10 | 15 | 20 | 25 | 30 |
| Cumulative Filtrate | 2.1 | 3.5 | 4.7 | 5.7 | 6.6 | 6.9 | 7.5 | 8.1 | 8.6 | 9.1 | 11.1 | 12.7 | 14.2 | 15.3 |
| × 2 | 4.2 | 7.0 | 9.4 | 11.4 | 13.2 | 13.8 | 15.0 | 16.2 | 17.2 | 18.2 | 22.2 | 25.4 | 28.4 | 30.6 |
| Cake Thickness (mm) | 2 | | | | | | | | | | | | | |

Return permeability analysis was done with high permeability Berea Sandstone. LVT-200 was used for simulation of oil. Return permeability was determined to be 90% for the Example 1 fluid and 60 for the Example 2 fluid. It is apparent that the inventive fluid of Example 1 had better fluid loss control (22.8 v. 30.6 at 30 minutes) and better return permeability (90% v. 60%).

EXAMPLE 3

Drilling fluids tested in this Example were two different calcium carbonate fluids with different particle size distributions and a graded salt drilling fluid. The drilling fluid DFA of this invention was a graded calcium carbonate fluid recommended for use on reservoirs from 60 millidarcies (md) to 5000 md of permeability. This fluid consisted of water soluble polymers, complex modified lignosulfonates and the graded calcium carbonate.

The drilling fluid DFB is a comparative fluid having a calcium carbonate system similar to that of DFA except that the particle size distribution was custom sized for 3000 md of reservoir permeability and was not as widely distributed over as many sizes as that of DFA. The drilling fluid DFC was a graded salt (NaCl) system containing a xanthum derivative polymer and an organic starch to enhance fluid loss properties of the fluid.

Flow Test Description

A flow test apparatus was constructed so that a $CaCO_3$ or NaCl particle filter cake could be placed inside a 3 in. (76 mm) I.D. porous aluminum oxide tube. This porous tube was attached to 3 in. (76 mm) I.D. PVC tubes (above and below the porous tube) and placed inside a 6 in. (150 mm) transparent, methylacrylate tube with flanges on each end. The total length of the inner concentric tubing string was 7 ft. (2.0 m). A centrifugal pump was manifolded to the test vessel, such that fluid could be circulated through the inner string or displaced through the concentric tubing annulus (formed by the inner string and the methylacrylate tube), through the porous tube (from outside to inside) and out through the inner tube. Pressure transducers were placed at the inlets and outlets of the inner tube and the concentric annulus. The pressure differential across the inlet and outlet of the inner tube was also monitored. A flow meter was also used on the discharge of the centrifugal pump so that all flow rates could be accurately monitored. All data was collected by a dedicated computer for each test performed and fluid losses from the inner tube were manually measured.

Test Procedures

Before performance of the actual flow tests, the "system pressure drop" was determined so that friction pressures would not be included in permeability calculations. The system pressure drop was determined by replacing the porous aluminum oxide tube with a perforated tube having the same dimensions of the porous tube. Fluid was injected through the concentric annulus, through the perforated tube and out of the apparatus through the 3 in. (76 mm) tube located below the perforated tube. The recorded pressure drops were, essentially, due to friction pressure and this friction pressure was termed the "system pressure drop".

The test procedure used for each completion fluid with three different drilling fluid systems is outlined below.

1. The test apparatus was filled with filtered tap water and the initial permeability of the porous tube was established by circulating filtered fluid through the annulus and porous tub. The pressure drop across the porous tub (from outside to inside) was calculated by subtracting the "system pressure drop" from the observed pressure drop. This method eliminated friction pressure from the calculation. Darcy's radial flow equation was used, with the corrected pressure drop to calculate the porous tube's permeability.

2. The filter cake was placed on the inside of the porous tube by circulating the appropriate drilling fluid through the inner tubing string at 1.5 BPM (barrels per min.; 0.2 m$^3$/min.) while allowing leak off through the porous tub to the annulus. After 10 minutes, the circulation rate was increased to 4.5 BPM (0.7 m$^3$/min.) and circulated at this rate for 10 minutes. Pressure drop between tubing and annulus was 50–60 psig (350 to 420 kPa).

3. The circulation rate was decreased to 1 BPM (0.16 m$^3$/min.) and the completion fluid was circulated for 10 minutes at this rate. Visual observations could be made through the transparent methylacrylate outer tube to see if the completion fluid was leaking off through the filter cake. In addition to visual observations, the valve on the annulus was left open so that the leak off rate could be measured.

4. After 10 minutes of circulation, the circulating rate was incremented to 2 BPM (0.3 m$^3$/min.) and maintained for 10 minutes.

5. The circulation rate was then incremented to 3.0 BPM (0.5 m$^3$/min.) and held at this rate for 20 minutes. Fluid loss rates were monitored throughout the test.

6. While circulating at 3 BPM (0.5 m$^3$/min.), 1 lbm/U.S. gal (120 kg/m$^3$) of 40-60 sand, was added to the completion fluid and continued at this rate for another 20 minutes. During all circulation tests the pressure difference between the inside and outside of the porous tube was maintained at 50 to 60 psig (350 to 420 kPa) by application of back pressure.

7. After the circulation tests were completed (steps 1. through 6.) the final permeability of the porous tube was measured by circulating filtered tap water through the porous tube (from outside to inside) via the annular circulation path.

8. Darcy's radial flow equation was then applied to calculate the final permeability of the porous tube.

9. A ratio of final permeability to initial permeability was then calculated for each fluid tested.

Besides the three drilling fluids DFA, DFB and DFC tested, three completion fluids, with and without 40-60 U.S. mesh sand were also tested. These fluids were: (1) filtered tap water (filtered, saturated NaCl brine for use with the graded salt drilling fluid), (2) filtered tap water viscosified with 0.48% hydroxyethylcellulose (HEC) (filtered saturated NaCl brine viscosified with 0.48% HEC for the graded salt drilling fluid), and (3) filtered tap water viscosified with 0.43% xanthum gum derivative (filtered, saturated NaCl brine viscosified with 0.43% xanthum gum derivative polymer for the graded salt drilling fluid). When sand was added to the fluids, a concentration of 1 lbm/U.S. gal (120 kg/m$^3$) of 40-60 mesh gravel pack sand per U.S. gallon of completion fluid was used. The sand slurries were tested because horizontal wells are sometimes gravel packed with these fluids. The data attained from the flow tests is summarized in Tables III through V. Each Table reflects the test results of all six completion fluid tests with a specific drilling fluid.

The porous tube permeabilities ranged from 3500 md to 6500 md, and the typical test pressures all ranged from 50–60 psig (350–420 kPa).

When the DFA and DFB drilling fluids were tested, the filter cakes manifested very little change with respect to fluid loss. The fluid loss rate appeared to be independent of completion fluid circulation rate with the exception of the water and sand slurry. When the sand was added to the water and this slurry was initially circulated across the filter cake, an initial increase in fluid loss was observed. However, as circulation time increased, the fluid loss rate again decreased to a level that was slightly greater than that of the water without sand. It should be noted that the fluid losses were much greater with DFC. This shows the importance of using the complex, modified lignosulfonates of this invention to provide a filter cake with excellent fluid loss prevention characteristics.

TABLE III

WELL SIMULATOR FLOW TEST RESULTS
DRILLING FLUID DFA
Porous Tube: I.D. = 3″, L = 2 ft

| | | | |
|---|---|---|---|
| Initial Permeability Kf, md | 3534 | 4725 | 6304 |
| Placement of Filter Cake Drilling Fluid | | | |
| Circulation loss | | | |
| Filtration Rate at 1.5 BPM, cc/min | | | |
| 1 min | 28 | 28 | 44 |
| 3 min | 18 | 22 | 34 |
| 6 min | 16 | 18 | 30 |
| 9 min | 14 | 17 | 30 |
| Filtrate Rate at 4.5 BPM, cc/min | | | |
| 1 min | 12 | 14 | 32 |
| 3 min | 12 | 14 | 18 |
| 6 min | 12 | 14 | 16 |
| 9 min | 12 | 14 | 16 |
| Completion Fluid Type | Water | 0.43% XC | 0.48% HEC |
| Completion Fluid Circulation loss | | | |
| Fluid Loss at 1 BPM, cc/min | | | |
| 1 min | | 48 | 12 |
| 3 min | | 48 | 12 | 240 |
| 6 min | | 38 | 12 | 116 |
| 9 min | | 28 | 12 | 74 |
| Fluid Loss at 2 BPM, cc/min | | | |
| 1 min | | 24 | 12 | |
| 3 min | | 24 | 12 | 36 |
| 6 min | | 26 | 12 | 26 |
| 9 min | | 26 | 12 | 22 |
| Fluid Loss at 3 BPM, cc/min | | | |
| 1 min | | 30 | 12 | 20 |
| 5 min | | 31 | 12 | 18 |
| 10 min | | 32 | 12 | 18 |
| 20 min | | 32 | 10 | 12 |
| Gravel Slurry Circulation Loss | | | |
| Fluid Loss at 3 BPM, cc/min | | | |
| 1 min | 220 | 10 | 12 |
| 5 min | 64 | 10 | 12 |
| 10 min | 52 | 12 | 12 |
| 20 min | 48 | 12 | 12 |
| Final Permeability Kf, md | 3121 | 4243 | 4702 |
| Return Permeability Ratio, Kf/Ki | 0.88 | 0.90 | 0.75 |

TABLE IV

WELL SIMULATOR FLOW TEST RESULTS
DRILLING FLUID DFB
Porous Tube: I.D. = 3″, L = 2 ft

| | | | |
|---|---|---|---|
| Initial Permeability Kf, md | 3279 | 3260 | 3260 |
| Placement of Filter Cake Drilling Fluid | | | |
| Circulation loss | | | |
| Filtration Rate at 1.5 BPM, cc/min | | | |
| 1 min | | | 36 |
| 3 min | 36 | 36 | 26 |
| 6 min | 32 | 30 | 24 |
| 9 min | 30 | 20 | 20 |
| Filtrate Rate at 4.5 BPM, cc/min | | | |
| 1 min | 32 | 20 | 20 |
| 3 min | 32 | 20 | 20 |
| 6 min | 38 | 20 | 20 |
| 9 min | 38 | 20 | 20 |
| Completion Fluid Type | Water | 0.43% XC | 0.48% HEC |
| Completion Fluid Circulation loss | | | |
| Fluid Loss at 1 BPM, cc/min | | | |
| 1 min | 18 | 15 | 350 |
| 3 min | 10 | 18 | 350 |
| 6 min | 10 | 16 | 25011 |
| 9 min | 18 | 16 | 170 |
| Fluid Loss at 2 BPM, cc/min | | | |
| 1 min | 20 | 15 | 150 |
| 3 min | 26 | 14 | 122 |
| 6 min | 28 | 16 | 100 |
| 9 min | 28 | 15 | 90 |
| Fluid Loss at 3 BPM, cc/min | | | |
| 1 min | 26 | 15 | 70 |
| 5 min | 28 | 15 | 58 |
| 10 min | 30 | 15 | 50 |
| 20 min | 32 | 14 | 36 |
| Gravel Slurry Circulation Loss | | | |
| Fluid Loss at 3 BPM, cc/min | | | |
| 1 min | 98 | 26 | 32 |
| 5 min | 60 | 22 | 30 |
| 10 min | 48 | 22 | 28 |
| 20 min | 42 | 20 | 20 |
| Final Permeability Kf, md | 3156 | 2921 | 2868 |
| Return Permeability Ratio, Kf/Ki | 0.96 | 0.90 | 0.88 |

TABLE V

WELL SIMULATOR FLOW TEST RESULTS
DRILLING FLUID DFC
Porous Tube: I.D. = 3″, L = 2 ft

| | | | |
|---|---|---|---|
| Initial Permeability Kf, md | 3141 | 2743 | 3164 |
| Placement of Filter Cake Drilling Fluid | | | |
| Circulation loss | | | |
| Filtration Rate at 1.5 BPM, cc/min | | | |
| 1 min | 22 | 40 | 46 |
| 3 min | 20 | 26 | 38 |
| 6 min | 14 | 16 | 38 |
| 9 min | 14 | 14 | 38 |
| Filtrate Rate at 4.5 BPM, cc/min | | | |
| 1 min | 10 | 14 | 38 |
| 3 min | 10 | 12 | 38 |
| 6 min | 10 | 12 | 38 |
| 9 min | 10 | 12 | 38 |
| Completion Fluid Type | NaCl | 0.43% XC in NaCl | 0.48% in NaCl |
| Completion Fluid Circulation loss | | | |
| Fluid Loss at 1 BPM, cc/min | | | |
| 1 min | 1000 | | 1500 |
| 3 min | 950 | 200 | 1700 |
| 6 min | 280 | 112 | 3500 |
| 9 min | 82 | 34 | 3500 |
| Fluid Loss at 2 BPM, cc/min | | | |
| 1 min | 96 | | 3200 |
| 3 min | 90 | 28 | 2700 |
| 6 min | 74 | 26 | 2400 |
| 9 min | 62 | 24 | 2200 |
| Fluid Loss at 3 BPM, cc/min | | | |
| 1 min | 74 | 34 | 1800 |
| 5 min | 64 | 34 | 1600 |
| 10 min | 58 | 34 | 1400 |
| 20 min | 46 | 18 | 1100 |

TABLE V-continued

WELL SIMULATOR FLOW TEST RESULTS
DRILLING FLUID DFC
Porous Tube: I.D. = 3", L = 2 ft

| Gravel Slurry Circulation Loss Fluid Loss at 3 BPM, cc/min | | | |
|---|---|---|---|
| 1 min | 188 | 30 | 1200 |
| 5 min | 56 | 30 | 1100 |
| 10 min | 32 | 18 | 1000 |
| 20 min | 24 | 16 | 800 |
| Final Permeability Kf, md | 3071 | 2335 | 2641 |
| Return Permeability Ratio, Kf/Ki | 0.98 | 0.85 | 0.83 |

Dynamic Filtration and Filter Cake Stability Test Procedure

Dynamic filtration tests were performed using DFA according to the following procedure. The test utilized a Dynamic HT-HP Filtration unit as described by Chesser, B. G., et. al., "Dynamic and Static Filtrate Loss Techniques for Monitoring Filter Cake Quality Improves Drilling Performance," SPE 20439, 1990 SPE Annual Technical Conference and Exhibition, New Orleans, LA, Sep. 23–26, 1990. The design and operating characteristics of this device were published in Chesser, B. G., "Dynamic Filtration of Drilling Fluid," *Advances in Filtration and Separation Technology, American Filtration Society*, Vol. 1, 1990, pp. 103–107. These details are incorporated by reference herein and thus will not be given here. The device consisted essentially of a high pressure filtration cell fitted with a motor driven shaft and propeller providing dynamic erosion of the cake. A three-bladed "tear-shaped" propeller with 1/16 in. clearance at the cell wall was utilized, providing a circulating action downward on the cake. This design tends to eliminate the highly variable shear rate from center to outer cell wall that is prevalent in a simple circular stirring motion.

The drilling fluid and flushing fluid were prepared immediately before the test. The dynamic filtration test to form the filter cake with the drilling fluid is as follows: First the fluid was filtered dynamically at 250° F. (120° C.), 500 psi (3500 kPa) and 300 rpm for 30 minutes, then static for 30 minutes, and finally dynamic at 600 rpm for 30 minutes. After forming the cake, the drilling fluid is removed from the cell and replaced with the flush fluid to measure the effects of the flush fluid on the existing filter cake. The flush fluid ran at 600 rpm with 500 psi (3500 kPa) for one hour measuring the filtration every five minutes. This procedure represents forming a dynamic filter cake when the formation is drilled, then addition filtrations under static conditions such as tripping, then returning to dynamic conditions at a higher annular velocity that might be encountered after a gravel pack screen is run into the well bore. The flush fluid removes the drilling fluid from the well bore before the gravel pack.

The leakoff characteristics of both DFA and the typical completion fluids observed in the flow test apparatus were similar to the dynamic filtration tests, performed at 250° F. (120° C.) and 500 psi (3500 kPa). Table VI displays the results of the dynamic filtration and filter cake stability tests. The results reflect no change in the thickness of the filter cake after it had been flushed with the completion fluids dynamically at 600 rpm for one hour. The dynamic filtration tests indicate that the filter cake remains stable at higher pressures and temperatures than could be predicted by flow tests.

Initial fluid losses for the HEC viscosified fluid were extremely high when compared to other fluids tested and this cannot be readily explained and did not correlate with dynamic filtration tests.

In summary, the filter cake particles for all drilling fluids tested did not appear to be eroded by circulation of the completion fluids. However, when sand was added to the filtered water (or saturated brine) the initial fluid loss rate increased as the brine-sand slurry reached the filter cake. But as circulation was continued the fluid loss rates began to decrease. This phenomenon could be due to a partial erosion of some filter cake particles, initially, coupled with the deposition of sand particles on top of the remaining filter cake. Most of the filter cake particles, $CaCO_3$ and NaCl, were removed by back flow, i.e. flow from outside to inside of the porous tube.

TABLE VI

DYNAMIC FILTRATION AND CAKE STABILITY TEST RESULTS
TEST CONDITION: 250 F., 500 PSI
DRILLING FLUID DFA

Dynamic Filtration of Drilling Fluid

| Time, minutes | | Filtration Volume, ml | |
|---|---|---|---|
| 0 | Dynamic | 0 | |
| 1 | @ 300 rpm | 3.8 | |
| 3 | | 4.8 | |
| 5 | | 6 | |
| 10 | | 7.4 | |
| 15 | | 8.4 | |
| 20 | | 9.4 | |
| 25 | | 10.2 | |
| 30 | | 11 | Cake 1 min |
| 40 | Static | 0 | |
| 50 | | 3.8 | |
| 60 | | 4.8 | Cake 1.5 min |
| 70 | Dynamic | 7.4 | |
| 80 | @ 600 rpm | 8.4 | |
| 90 | | 9.4 | Cake 1 min |

Filter Cake Stability Test
Dynamic @ 600 rpm

| | Cummulative fluid loss, ml Flush Fluid Type: | | |
|---|---|---|---|
| Time, minutes | Water | 0.43% XC | 0.48% HEC |
| 0 | 0 | 0 | 0 |
| 5 | 6.6 | 0.4 | 0.6 |
| 10 | 8 | 1 | 0.8 |
| 15 | 8.6 | 1.6 | 1 |
| 20 | 9.4 | 2.2 | 1.1 |
| 25 | 10.2 | 3 | 1.3 |
| 30 | 11 | 3.6 | 1.7 |
| 35 | 11.8 | 4.2 | 2.2 |
| 40 | 13 | 5 | 2.7 |
| 45 | 14 | 5.8 | 3.3 |
| 50 | 15 | 6.6 | 3.6 |
| 55 | 15.8 | 7.2 | 4 |
| 60 | 16.8 | 8 | 4.7 |
| | Cake 1 min | Cake 1 min | Cake 1 min |

TABLE VII

FILTER CAKE REMOVAL TEST
70-270 SAND/40-60 GRAVEL PACK
TEST TEMP. = 75 F.

| Drilling Fluid | DFA | DFB | DFC |
|---|---|---|---|
| Particulate Type | $CaCO_3$ | $CaCO_3$ | Salt |
| Core Diameter, cm | 3.74 | 3.74 | 3.74 |
| Core Area, cm2 | 10.98 | 10.98 | 10.98 |
| Core Length, cm | 31.75 | 31.75 | 31.75 |
| Water viscosity, cps | 1 | 1 | 1 |
| Water density, lb/gal | 8.345 | 8.345 | 8.345 |

TABLE VII-continued

FILTER CAKE REMOVAL TEST
70-270 SAND/40-60 GRAVEL PACK
TEST TEMP. = 75 F.

| INITIAL PERMEABILITY | | | |
|---|---|---|---|
| Q, cc/min | 60 | 62 | 60 |
| DP, psi | 5.95 | 5 | 5.4 |
| Ki, md | 7144.47 | 8785.32 | 7872.15 |
| FILTER CAKE FORMED @ 80 psi for 60 minutes: | | | |
| Spurt Loss, cc | 5 | 5 | 5 |
| Total Fluid Loss Volume, cc | 9 | 10 | 9 |
| Displace drilling fluid with 1000 ml water @ 62 cc/min & 50 psi: | 7 | 20 | NM |
| Fluid loss through core, cc | | | |

Place 40/60 gravel on top of sand column (the remaining filter cake will be sandwiched between the sand pack and the gravel). Flow D.I. water from the sand side through the gravel side to determine the removal of the remaining filter cake through the 40/60 gravel.

| RETURN PERMEABILITY | | | |
|---|---|---|---|
| Volume pumped, ml | 100 | 100 | 100 |
| Q, cc/min | 62 | 23 | 60 |
| DP, psi | 8.7 | 140 | 7.5 |
| Kf, md | 5049.03 | 116.40 | 5667.95 |
| Kf/Ki | 0.71 | 0.01 | 0.72 |
| Volume pumped, ml | 2000 | Plugged | 2000 |
| Q, cc/min | 62 | | 60 |
| DP, psi | 9.9 | | 6.24 |
| Kf, md | 4437.03 | | 6812.44 |
| Kf/Ki | 0.62 | | 0.87 |
| Volume pumped, ml | 12000 | | 3000 |
| Q, cc/min | 62 | | 60 |
| DP, psi | 6.62 | | 6.15 |
| Kf, md | 6635.44 | | 6912.13 |
| Kf/Ki | 0.93 | | 0.88 |

Particle Flow Tests

Additional testing was performed to see if it was possible for the filter cake particles to flow through a gravel pack of 40-60 U.S. mesh sand. It was possible to place the filter cakes (from DFA, DFB and DFC) on a bed of 70-270 U.S. mesh sand (to simulate reservoir sand). The test procedure was as follows:

1. A sand bed of 40-60 U.S. mesh gravel pack sand was placed on top of the 70-270 sand pack and was contained between the sand pack and a screen at the top of the cell.
2. Water was injected through the 70-270 U.S. mesh sand pack and 40-60 U.S. mesh gravel pack to determine the effective initial permeability of both sand beds.
3. The 40-60 U.S. mesh sand pack was removed and a filter cake was produced on the 70-270 U.S. mesh sand pack by injecting the specific drilling fluid across the face of the sand bed while holding a back pressure of 80 psig (560 kPa) on this flow. This allowed the drilling fluid to leak off through the sand pack and deposit its filter cake. The spurt (initial) and filtrate losses were measured and recorded.
4. The drilling fluid was then displaced with filtered tap (or saturated NaCl brine) water and an induced back pressure of 50 psig (350 kPa) was applied so that the filter cake would not be disturbed. The fluid loss through the sand pack was recorded.
5. The 40-60 U.S. mesh sand was then repacked on the 70-270 U.S. mesh pack.
6. Water was then injected from the 70-270 U.S. mesh sand pack side, through the simulated gravel pack. The flow rate and pressure drop across the two sand packs were recorded as a function of total volume of fluid displaced. The return permeability of the two sand packs could then be used to indicate the degree of filter cake particle displacement. Table VII reflects the results of the particle displacement tests.

The test using DFA showed an initial 71% return permeability, then dropped to 62% (due to particle invasion into the gravel pack), and finally increased to 93% after a total of 12 liters of water was injected. This indicated that most of the filter cake particles were capable of flowing through a 40-60 U.S. mesh gravel pack. However, this "particle flow" requires time and does not occur quickly.

The "particle flow" tests using a filter cake deposited by the DFB fluid showed a very low return permeability. This low return permeability can be attributed to a retention of particles between the 70-270 U.S. mesh sand pack and 40-60 U.S. mesh, simulated gravel pack. It is apparent that hydrochloric acid is required to remove filter cake particles when this drilling fluid is used. It is apparent that the cake from the combination of a wide distribution of graded $CaCO_3$ particles with a polymerized lignosulfonate of DFA is more easily removed than that of DFB.

The "particle flow" tests performed with a filter cake from the graded salt system, DFC, indicate a return permeability of 72% after displacement of 3 liters of tap water, at which time the injection pressure stabilized. The tap water is capable of dissolving approximately 3.1 lbm (1400 g) per U.S. gallon (3.785 ml) of tap water. Therefore, the graded salt (NaCl) particles are more readily removed.

Conclusions for Example 3

1. The erosion of filter cake particles by circulation of completion fluids (without solids) was not noted on any of the three filter cake systems tested. The viscosities and velocities of the "typical completion fluids" ranged from 1 cp ($10^3$ Pa·sec) to 113 (113,00 Pa·sec) and 1.9 ft/sec (60 cm/sec) to 5.7 ft/sec (175 cm/sec), respectively.
2. All of the filter cake particles were readily displaced from the porous tube's surface with backflow and no gravel pack present.
3. When filter particles were "sandwiched" between formation sand and gravel pack, only partial removal by backflow was attained. Therefore, acidizing is required to speed up the clean up process and restore permeability on a comparative fluid such as DFB. DFA however probably would not require these steps; this is further evidence that the filter cake particles come off the well bore surface as particles rather than in masses or clumps. 4. High leak-off rates were attained with the HEC viscosified fluid and this phenomenon was not seen on the dynamic filtration/filter cake stability test performed with the DFA fluid, again demonstrating the superiority of the subject invention.

EXAMPLE 4

Several drill-in fluids were prepared, modified and tested using a dynamic filtration unit and a return permeameter. Of the fluids tested, the following inventive fluid showed the most promise of being a fluid that can be used in several different situations to protect the production zone. The fluid described in Table VIII consists of water and four other products: Biozan as a thixotropic polymer, Filtrex as a modified complex lignosulfonate also used for filtration control, KCl for the inhibition of the clays in the formation and SRP-0197, a graded calcium carbonate. Although the system is quite simple, tests have demonstrated that the fluid can be used to drill a wide range of permeable zones while minimizing formation damage. Later it will be demonstrated that the KCl may be eliminated.

TABLE VIII

Example 4 Formulation

Aged Temperature: 150° F. for 2 hours
Rheology @: 120° F.

|  | Example 4 |
|---|---|
| Pilot Test Additives | |
| Tap Water | 317 |
| Biozan | 1.5 |
| Filtrex | 15 |
| KCl | 12.9 |
| SRP-0197 | 50 |
| Properties | |
| Density, lbm/gal | 9 |
| 600 rpm reading | 56 |
| 300 rpm reading | 44 |
| Plastic Viscosity, cP | 12 |
| Yield Point, lbf/100 ft$^2$ | 32 |
| Initial Gel, lbf/100 ft$^2$ | 15 |
| Ten Minute Gel, lbf/100 ft$^2$ | 20 |
| API Filtrate, cc/30 min. | 4.4 |

Testing

As mentioned, in order for a solid ladened fluid to mechanically seal pore openings it first must be comprised of the proper size particles. The particle size analysis of SRP-0197 calcium carbonate of Milpark Drilling Fluids used in this drill-in fluid indicates a wide distribution of particles of very different sizes as shown in Table IX. As shown from Table IX, the particle size is evenly distributed from colloidal to 60 microns. Table X illustrates the particle size analysis of the drill-in fluid as tested.

TABLE IX

Particle Size Analysis
Cilas 715 Granulometer Particle Size Analyser
SRP 0197

| Particle Size (microns) | Percent Smaller Than Given Size | Percent Smaller Than Given Size, But Larger Than Next Size |
|---|---|---|
| 192 | 100 | 0 |
| 128 | 100 | 0 |
| 96 | 100 | 6.8 |
| 64 | 93.2 | 6.8 |
| 48 | 86.4 | 20.3 |
| 32 | 66.1 | 12.4 |
| 24 | 53.7 | 10.4 |
| 16 | 43.3 | 7.3 |
| 12 | 36 | 7.2 |
| 8 | 28.8 | 6.2 |
| 6 | 22.6 | 5.8 |
| 4 | 16.8 | 3.9 |
| 3 | 12.9 | 2.9 |
| 2 | 10 | 2.8 |
| 1.5 | 7.2 | 1.2 |
| 1 | 6 | 6 |
| Calculated Surface Area (m$^2$/cm3) | | 1.48 |
| 90% Smaller Than (microns) | | 54.8 |
| 50% Smaller Than (microns) | | 21.2 |
| 10% Smaller Than (microns) | | 2 |

TABLE X

Particle Size Analysis
Cilas 715 Granulometer Particle Size Analyser
Sample: DRILL IN FLUID

| Particle Size (microns) | Percent Smaller Than Given Size | Percent Smaller Than Given Size, But Larger Than Next Size |
|---|---|---|
| 192 | 100 | 0 |
| 128 | 94.2 | 17.2 |
| 96 | 77 | 19.3 |
| 64 | 57.7 | 11.9 |
| 48 | 45.8 | 16.9 |
| 32 | 28.9 | 8.8 |
| 24 | 20.1 | 5.8 |
| 16 | 14.3 | 4 |
| 12 | 10.3 | 3.9 |
| 8 | 6.4 | 2 |
| 6 | 4.4 | 1 |
| 4 | 3.4 | 0.6 |
| 3 | 2.8 | 0.5 |
| 2 | 2.3 | 0.8 |
| 1.5 | 1.5 | 0.3 |
| 1 | 1.2 | 1.2 |
| Calculated Surface Area (m$^2$/cm3) | | 0.41 |
| 90% Smaller Than (microns) | | 117.6 |
| 50% Smaller Than (microns) | | 53.2 |
| 10% Smaller Than (microns) | | 11.7 |

To demonstrate the ability of the fluid to mechanically seal the pore openings, dynamic filtration and return permeability tests were conducted using sands with low and high permeability. See Table XI below.

TABLE XI

|  | Dynamic Filtration | Return Permeability |
|---|---|---|
| Low K | Berea Sandstone (± 175 md) | South American Sandstone (61 md) |
| High K | Aloxite (2-4 darcy) | Berea Sandstone (1.5 darcy) |

Dynamic Filtration Test

The dynamic filtration tests were conducted at 250° F. with 500 psi differential pressure and stirring the fluid at 300 rpm for 30 minutes. The filter cakes formed from the dynamic filtration (see Table XII) were measured and found to be very thin (1–1.5 mm) and extremely durable. As one would expect, the cumulative filtration using the low permeability berea was less than the filtration using the aloxite disk, but the equilibrium filtration rates after the filter cakes were formed were identical. This illustrates that the resulting filter cakes have very low permeability and quickly control the filtration of the fluid.

TABLE XII

Dynamic Filtration Test

Temperature = 250° F.
Diff. Pressure = 500 psi
RPM = 300

|  | Test 1 | Test 2 |
|---|---|---|
|  | Filter Medium | |
|  | Aloxite (2-4 Darcy) | Berea (150 md) |
|  | Cake Thickness, mm | |
|  | 1 | 1.5 |
| Time (minutes) | Cumulative Filtration (mL) | |
| 0 | 0 | 0 |
| 1 | 4.5 | 1.5 |
| 2 | 5.5 | 2 |
| 3 | 6 | 2.2 |
| 4 | 6.5 | 2.5 |
| 5 | 7 | 2.8 |
| 6 | 7.5 | 3.2 |
| 7 | 8 | 3.5 |

TABLE XII-continued

| Dynamic Filtration Test | | |
|---|---|---|
| Temperature = | 250° F. | |
| Diff. Pressure = | 500 psi | |
| RPM = | 300 | |
| | Test 1 | Test 2 |
| | Filter Medium | |
| | Aloxite (2-4 Darcy) | Berea (150 md) |
| | Cake Thickness, mm | |
| | 1 | 1.5 |
| Time (minutes) | Cumulative Filtration (mL) | |
| 8 | 8.2 | 3.7 |
| 9 | 8.5 | 4 |
| 10 | 8.7 | 4.2 |
| 15 | 9.5 | 5 |
| 20 | 10.5 | 5.8 |
| 25 | 11.5 | 6.5 |
| 30 | 12 | 7.2 |

Return Permeability Test

The return permeability tests also indicate the fluid will minimize formation damage over a wide range of permeability. Table XIII shows the return permeability test for a core of low and high permeability again demonstrating the fluid's ability to minimize formation damage.

TABLE XIII

| | Return Permeability Test | | | |
|---|---|---|---|---|
| | High Permeability Berea | | South American Sandstone | |
| | Before | After | Before | After |
| Time, sec. | 116 | 136 | 163 | 160 |
| Length, cm | 4.34 | 4.34 | 2.82 | 2.82 |
| Volume, cc | 20 | 20 | 15 | 15 |
| Pressure, psi | 4.2 | 4.2 | 37 | 40 |
| Viscosity, cP | 2.9 | 2.9 | 2.9 | 2.9 |
| Diameter, cm | 2.5 | 2.5 | 2.5 | 2.5 |
| Permeability, md | 1547 | 1329 | 61 | 57 |
| Return Permeability | 86% | | 94% | |

Cake Durability Test

A drill-in fluid should not only produce a thin filter cake with low fluid loss to the production zone, but it should also be durable. A durable filter cake is needed so tools can be run and set. The fluid can then be displaced without destroying the filter cake resulting in loss of fluid to the formation. To examine this process, the dynamic filtration unit was used with the drill-in fluid and water.

(1) First, a dynamic filter cake was built at 300 rpm of thirty (30) minutes.

(2) Second, static filtration was measured for thirty (30) minutes.

(3) Third, dynamic filtration at 600 rpm was measured for thirty (30) minutes to simulate circulating with a tool.

(4) Fourth, dynamic filtration at 600 rpm with water was measured for thirty (30) minutes to simulate the displacement of the drill-in fluid with water.

Table XIV shows the filtrate and the resulting cake thickness for the four aforementioned steps. It is noted that the filter cake thickness increased during the static mode, but was easily removed by the higher shear during the second dynamic filtration period. The filter cake proved to be very durable during the third dynamic filtration period when water was used at the high shear rate and no decrease in cake thickness was recorded with slight increase in filtrate rate during the final ten minutes.

TABLE XIV

| Dynamic Filtration Results | | |
|---|---|---|
| Temperature = | | 250° F. |
| Diff. Pressure = | | 500 psi |
| | Time (minutes) | Cumulative Filtration (mL) |
| Dynamic at 300 rpm | 0 | 0 |
| | 1 | 3.8 |
| | 2 | 4.2 |
| | 3 | 4.8 |
| | 4 | 5.4 |
| | 5 | 6 |
| | 6 | 6.4 |
| | 7 | 6.6 |
| | 8 | 7 |
| | 9 | 7.2 |
| | 10 | 7.4 |
| | 15 | 8.4 |
| | 20 | 9.4 |
| | 25 | 10.2 |
| Cake thickness: 1 mm | 30 | 11 |
| Static | 40 | 12.4 |
| | 50 | 13.6 |
| Cake Thickness: 1.5 mm | 60 | 14.6 |
| Dynamic at 600 rpm | 70 | 15.6 |
| | 80 | 16.6 |
| Cake Thickness: 1 mm | 90 | 17.4 |
| Dynamic with water | 100 | 18.8 |
| at 600 rpm | 110 | 20.2 |
| Cake Thickness: 1 mm | 120 | 25 |

EXAMPLES 5, 6 and 7

Additional tests were conducted using the Q-200 graded calcium carbonate from Huber to examine the effects of the liquid phase of the fluid. The tests indicated that reducing the KCl from four to two percent or switching to seawater had minor effects on filtration and cake quality. However the fluid prepared in freshwater had higher rheological properties and filtration than when seawater was used. It may thus be understood that KCl may be eliminated from the formulation and seawater used. Table XV shows the formulations which were tested, 2% KCl, seawater and freshwater. Table XVI provides the dynamic filtration results.

TABLE XV

| Fluid Formulations of Examples 5-7 | | | |
|---|---|---|---|
| Aged Temperature: | 150° F. for 2 hours | | |
| Rheology @: | 120° F. | | |
| | Ex. 5 | Ex. 6 | Ex. 7 |
| | Pounds Per Barrel | | |
| Pilot Test Additives | | | |
| Tap Water | 317 | — | 317 |
| Sea Water | — | 317 | — |
| Filtrex | 15 | 15 | 15 |
| KCl | 6.4 | — | — |
| Biozan | 1.5 | 1.5 | 1.5 |
| Q-200 | 50 | 50 | 50 |
| Properties | | | |
| Plastic Viscosity, cP | 12 | 12 | 13 |
| Yield Point, lbf/100 ft$^2$ | 35 | 33 | 52 |
| Initial Gel, lbf/100 ft$^2$ | 18 | 15 | 23 |
| Ten Min. Gel, lbf/100 ft$^2$ | 25 | 19 | 28 |

TABLE XVI

Dynamic Filtration Results

| | |
|---|---|
| Temperature = | 250° F. |
| Diff. Pressure = | 500 psi |
| RPM = | 300 |
| Cake Thickness = | 1 mm |

| | Example No.: | | |
|---|---|---|---|
| Time (minutes) | 5 Cumulative Filtration (mL) | 6 Cumulative Filtration (mL) | 7 Cumulative Filtration (mL) |
| 0 | 0 | 0 | 0 |
| 1 | 4 | 3.8 | 6 |
| 2 | 5 | 4.6 | 6.6 |
| 3 | 5.6 | 5.2 | 7.2 |
| 4 | 6 | 5.8 | 7.8 |
| 5 | 6.4 | 6.2 | 8.2 |
| 6 | 7 | 6.8 | 8.8 |
| 7 | 7.2 | 7 | 9.2 |
| 8 | 7.5 | 7.2 | 9.4 |
| 9 | 7.8 | 7.4 | 9.8 |
| 10 | 8 | 7.8 | 10.2 |
| 15 | 9.2 | 8.6 | 11.8 |
| 20 | 10 | 9.2 | 13 |
| 25 | 10.8 | 10 | 14.2 |
| 30 | 11.4 | 10.8 | 15.6 |

EXAMPLE 8

The effects of drill solids contamination on a dilution fluid were also examined by employing one and two percent Rev Dust using a fluid of the following formation: tap water, 317; Biozan, 1.5; Filtrex, 15; Q-200, 50 and KCl, 12.9; all units in pounds per barrel. One percent Rev Dust showed no detrimental effects compared to the base mud, while two percent Rev Dust resulted in a slightly thicker filter cake on the dynamic filtration test.

EXAMPLE 9

The effects of adding 40/60 frac sand to the flush fluid for the inventive drilling fluid. The base drill-in fluid was prepared as in Example 5 and aged for 16 hours at 150° F., rotating. The flush fluid used in this test contained 1.5 ppb XCD polymer and 42.0 ppb 40/60 frac sand. The dynamic filtration test was conducted as follows:

1) 30 minutes at 300 rpm—(Dynamic filtration)
2) 30 minutes static filtration
3) 30 minutes at 600 rpm—(Dynamic filtration)
4) Cooled to room temperature, mud removed, then filled with flush fluid
5) 60 minutes at 600 rpm—(Dynamic filtration)

The test indicated that the 40/60 frac sand had minimal effects on the filtration rate during the 60 minutes of exposure. The rate of filtration at the end of the first 10 minutes was 0.1 cc/min. and gradually increased to 0.14 cc/min. during the last 10 minutes of the test.

Many modifications may be made in the composition and implementation of this invention without departing from the spirit and scope thereof which are defined only in the appended claims. For example, the exact modified lignosulfonate may be different from those used here and the graded calcium carbonate may have a different exact size distribution than those used in these examples.

GLOSSARY

| | |
|---|---|
| 40/60 Frac Sand | Gravel pack sand per API specifications: RP 58 March 31, 1986. |
| Baracarb | Sized calcium carbonate sold by Baroid and manufactured by Metsa-Serla. |
| Baranex | Modified lignosulfonate marketed through Baroid. |
| Biozan | A water soluble polymer used as thixotropic polymer sold by Milpark Drilling Fluids, manufactured by Chemstar. |
| Dacalite 104 | Synthetic silicon sold by Gretco Inc. |
| Filtrex | A modified lignosulfonate sold by Milpark Drilling Fluids. |
| LVT-200 | Synthetic oil marketed through Conoco Inc. |
| XCD | Xanthum gum marketed by Kelco Inc. |

We claim:

1. A fluid system for controlling fluid losses during hydrocarbon recovery operations, comprising:
   water;
   a distribution of graded calcium carbonate particle sizes; and
   at least one modified lignosulfonate, which is a lignosulfonate modified by polymerizing it at least to an extent effective to reduce its water solubility.

2. The fluid system of claim 1 where the system comprises from about 70 to 90 wt. % water; about 10 to 30 wt. % blend of graded calcium carbonate particle sizes; and from about 2 to about 5 wt. % modified lignosulfonate.

3. The fluid system of claim 1 where the system comprises from about 73 to 83 wt. % water; about 13 to 24 wt. % blend of graded calcium carbonate particle sizes; and from about 3 to about 4 wt. % modified lignosulfonate.

4. The fluid system of claim 1 where the system comprises from about 78 to 83 wt. % water; about 13 to 18 wt. % blend of graded calcium carbonate particle sizes; and from about 3 to about 4 wt. % modified lignosulfonate.

5. The fluid system of claim 1 where the system comprises from about 82 to 83 wt. % water; about 13 to 14 wt. % blend of graded calcium carbonate particle sizes; and from about 3 to about 4 wt. % modified lignosulfonate.

6. The fluid system of claim 1 where a thixotropic polymer is present to keep the graded calcium carbonate particles and the modified lignosulfonate in suspension.

7. The fluid system of claim 1 further having the property of forming a durable filter cake which can be removed with a pressure of no greater than 10 psi.

8. A fluid system for controlling fluid losses during hydrocarbon recovery operations, comprising:
   about 70 to 90 wt. % water;
   about 10 to 30 wt. % of a distribution of graded calcium carbonate particle sizes;
   about 2 to about 5 wt. % of at least one modified lignosulfonate; and
   about 0.25 to about 0.40 wt. % of a thixotropic polymer.

9. The fluid system of claim 8 where the system comprises from about 73 to 83 wt. % water; about 13 to 24 wt. % blend of graded calcium carbonate particle sizes; and from about 3 to about 4 wt. % modified lignosulfonate.

10. The fluid system of claim 8 where the graded calcium carbonate particle sizes comprise the following distribution:

| Particle Size (microns) | Percent Smaller Than Than Given Size, But Larger Than Next Size |
|---|---|
| 128 | 0 |
| 96 | 6.1–7.5 |
| 64 | 6.1–7.5 |
| 48 | 18.3–22.3 |
| 32 | 11.2–13.6 |
| 24 | 9.4–11.4 |
| 16 | 6.6–8.0 |
| 12 | 6.5–7.9 |
| 8 | 5.6–6.8 |
| 6 | 5.2–6.4 |
| 4 | 3.5–4.3 |
| 3 | 2.6–3.2 |
| 2 | 2.5–3.1 |
| 1.5 | 1.1–1.3 |
| 1 | 5.4–6.6 |

11. The fluid system of claim 9 where the modified lignosulfonate is a lignosulfonate modified by polymerizing it at least to an extent effective to reduce its water solubility.

12. A fluid system for controlling fluid losses during hydrocarbon recovery operations, comprising:
about 73 to 83 wt. % water;
about 13 to 24 wt. % of a distribution of graded calcium carbonate particle sizes;
about 3 to about 4 wt. % of at least one modified lignosulfonate, modified by polymerizing it at least to an extent effective to reduce its water solubility; and
about 0.31 to about 0.35 wt. % of a thixotropic polymer.

13. The fluid system of claim 13 where the graded calcium carbonate particle sizes comprise the following distribution:

| Particle Size (microns) | Percent Smaller Than Than Given Size, But Larger Than Next Size |
|---|---|
| 128 | 0 |
| 96 | 6.1–7.5 |
| 64 | 6.1–7.5 |
| 48 | 18.3–22.3 |
| 32 | 11.2–13.6 |
| 24 | 9.4–11.4 |
| 16 | 6.6–8.0 |
| 12 | 6.5–7.9 |
| 8 | 5.6–6.8 |
| 6 | 5.2–6.4 |
| 4 | 3.5–4.3 |
| 3 | 2.6–3.2 |
| 2 | 2.5–3.1 |
| 1.5 | 1.1–1.3 |
| 1 | 5.4–6.6 |

14. A method of protecting a well bore during a hydrocarbon recovery operation and controlling fluid losses during such operation, comprising the steps of:
injecting a fluid system for controlling fluid losses during hydrocarbon recovery operations into the well bore, said well bore having a surface, said fluid system comprising:
water;
a distribution of graded calcium carbonate particle sizes; and
at least one modified lignosulfonate, which is a lignosulfonate modified by polymerizing it at least to an extent effective to reduce its water solubility;
permitting the fluid system to set up a filter cake on the surface of the well bore;
conducting the hydrocarbon recovery operation within the filter cake within the well bore; and
removing the filter cake from the well bore.

15. The method of claim 14 where the fluid system comprises from about 70 to 90 wt. % water; about 10 to 30 wt. % blend of graded calcium carbonate particle sizes; and from about 2 to about 5 wt. % modified lignosulfonate.

16. The method of claim 14 where the fluid system comprises from about 73 to 83 wt. % water; about 13 to 24 wt. % blend of graded calcium carbonate particle sizes; and from about 3 to about 4 wt. % modified lignosulfonate.

17. The method of claim 14 where the fluid system further comprises a thixotropic polymer to keep the graded calcium carbonate particles and the modified lignosulfonate in suspension.

18. The method of claim 14 where in the step of removing the filter cake from the well bore, the filter cake is removed at a pressure of no greater than 10 psi.

19. The method of the claim 14 where the well bore is in a formation having a permeability, and where the permeability of the formation prior to injecting the fluid system is $K_i$ and the permeability of the formation after removing the filter cake from the well bore is $K_f$; and where $K_f/K_i$ ranges from 0.90 to 1.0.

* * * * *